United States Patent
Yamada

(10) Patent No.: US 9,365,683 B2
(45) Date of Patent: Jun. 14, 2016

(54) POLYCARBONATE-POLYORGANOSILOXANE COPOLYMER AND METHOD FOR PRODUCING SAME

(71) Applicant: IDEMITSU KOSAN CO., LTD., Chiyoda-ku (JP)

(72) Inventor: Aki Yamada, Sodegaura (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

(21) Appl. No.: 14/771,619

(22) PCT Filed: Sep. 22, 2014

(86) PCT No.: PCT/JP2014/075132
§ 371 (c)(1),
(2) Date: Aug. 31, 2015

(87) PCT Pub. No.: WO2015/087595
PCT Pub. Date: Jun. 18, 2015

(65) Prior Publication Data
US 2016/0017102 A1 Jan. 21, 2016

(30) Foreign Application Priority Data
Dec. 10, 2013 (JP) .................. 2013-255213

(51) Int. Cl.
C08G 77/448 (2006.01)
C08G 81/00 (2006.01)
(Continued)

(52) U.S. Cl.
CPC ............. *C08G 81/00* (2013.01); *C08G 64/186* (2013.01); *C08G 77/04* (2013.01); *C08G 77/448* (2013.01)

(58) Field of Classification Search
None
See application file for complete search history.

(56) References Cited

U.S. PATENT DOCUMENTS

| 5,488,086 A | 1/1996 | Umeda et al. |
| 5,502,134 A | 3/1996 | Okamoto et al. |

(Continued)

FOREIGN PATENT DOCUMENTS

| JP | 4 225062 | 8/1992 |
| JP | 8 81620 | 3/1996 |

(Continued)

OTHER PUBLICATIONS

Third Party Submission issued Dec. 18, 2015 in Japanese Patent Application No. 2015-122364.

(Continued)

*Primary Examiner* — Robert S Loewe
(74) *Attorney, Agent, or Firm* — Oblon, McClelland, Maier & Neustadt, L.L.P.

(57) ABSTRACT

Provided is a polycarbonate-polyorganosiloxane copolymer, including a specific polycarbonate block unit (A) and a specific polyorganosiloxane block unit (B), in which in a differential molecular weight distribution curve obtained from measurement of the polyorganosiloxane block unit (B) by gel permeation chromatography using the polystyrene calibration curve, the curve having an axis of abscissa indicating a logarithmic value log(M) of a molecular weight M and an axis of ordinate indicating dw/d log(M) obtained by differentiating a concentration fraction w with respect to the logarithmic value log(M) of the molecular weight, (1) a dw/d log(M) value becomes maximum in a range of $3.4 \leq \log(M) \leq 4.0$, and (2) in the differential molecular weight distribution curve, a ratio of a value obtained by integrating the dw/d log(M) value over a range of $4.0 \leq \log(M) \leq 4.5$ to a value obtained by integrating the dw/d log(M) value over the entire range of the log(M) is 6% or more and 40% or less.

15 Claims, 1 Drawing Sheet

(51) Int. Cl.
*C08G 64/18* (2006.01)
*C08G 77/04* (2006.01)

(56) References Cited

U.S. PATENT DOCUMENTS

| | | | |
|---|---|---|---|
| 2003/0027905 A1 | 2/2003 | Mahood et al. | |
| 2004/0030044 A1 | 2/2004 | Okamoto et al. | |
| 2004/0220330 A1* | 11/2004 | DeRudder | C08G 4/186 524/837 |
| 2005/0101757 A1 | 5/2005 | Glasgow et al. | |
| 2006/0142486 A1* | 6/2006 | DeRudder | C08L 51/04 525/71 |
| 2012/0271009 A1 | 10/2012 | Higaki et al. | |
| 2012/0283393 A1 | 11/2012 | Ishikawa | |
| 2012/0296051 A1* | 11/2012 | Huggins | C08G 77/448 525/450 |
| 2012/0309922 A1* | 12/2012 | Kim | C08G 64/186 528/25 |
| 2013/0261235 A1* | 10/2013 | Minemura | C08G 77/42 524/165 |
| 2013/0267665 A1* | 10/2013 | Huggins | C08G 77/04 525/446 |
| 2013/0303672 A1* | 11/2013 | Aoki | C08K 3/22 524/166 |
| 2014/0206802 A1* | 7/2014 | Bahn | C08G 64/186 524/265 |
| 2014/0249280 A1* | 9/2014 | Kim | C08G 77/48 525/464 |

FOREIGN PATENT DOCUMENTS

| | | |
|---|---|---|
| JP | 2662310 | 10/1997 |
| JP | 10-245711 A | 9/1998 |
| JP | 2002 146194 | 5/2002 |
| JP | 2004 536193 | 12/2004 |
| JP | 2006 523243 | 10/2006 |
| JP | 2007 510795 | 4/2007 |
| JP | 2011 21127 | 2/2011 |
| JP | 2011 46911 | 3/2011 |
| JP | 2011 46913 | 3/2011 |
| JP | 2011 122048 | 6/2011 |
| JP | 2012 246430 | 12/2012 |
| WO | WO 91/00885 A1 | 1/1991 |

OTHER PUBLICATIONS

Matthew Pixton, et al., "Structure to Property Relationships in Polycarbonate/Polydimethylsiloxane Copolymers" ANTEC 2006, 2006, 6 Pages.

International Search Report Issued Oct. 21, 2014 in PCT/JP2014/075132 Filed Sep. 22, 2014.

* cited by examiner

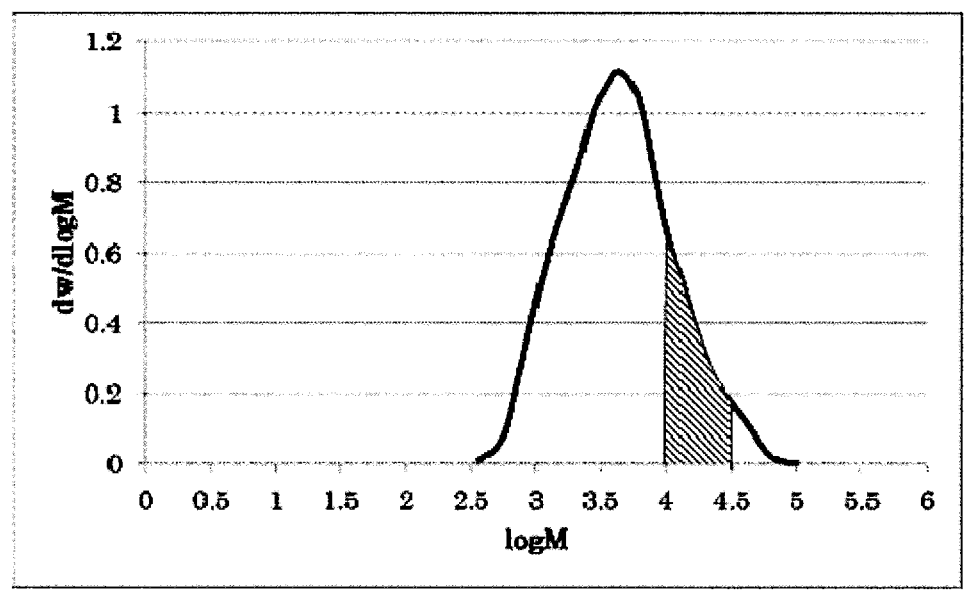

POLYCARBONATE-POLYORGANOSILOXANE COPOLYMER AND METHOD FOR PRODUCING SAME

TECHNICAL FIELD

The present invention relates to a polycarbonate-polyorganosiloxane copolymer, which is excellent in transparency and has low-temperature impact resistance, and a method of producing the copolymer.

BACKGROUND ART

A polycarbonate-polyorganosiloxane polymer (hereinafter sometimes abbreviated as "PC-POS") has been attracting attention because of its excellent properties such as high impact resistance, chemical resistance, and flame retardancy. Accordingly, the PC-POS has been expected to be widely utilized in various fields such as the field of electrical and electric equipment, and the field of automobiles. In particular, the utilization of the PC-POS in housings for a cellular phone, a mobile personal computer, a digital camera, a video camera, an electric tool, and the like, and in other commodities has been expanding.

In normal cases, a homopolycarbonate using 2,2-bis(4-hydroxyphenyl)propane [common name: bisphenol A] as a dihydric phenol as a raw material has been generally used as a typical polycarbonate. A polycarbonate-polyorganosiloxane copolymer using a polyorganosiloxane as a copolymerizable monomer has been known for improving the physical properties of the homopolycarbonate such as flame retardancy and impact resistance (see Patent Documents 1 to 3).

When the impact resistance of the polycarbonate-polyorganosiloxane copolymer, in particular, its impact resistance under low temperature is improved, as disclosed in Patent Document 3, a method involving using a polyorganosiloxane having a long chain length has been known. However, the method has involved a problem in that the transparency of the copolymer reduces.

On the other hand, a method involving using a polyorganosiloxane having a relatively short chain length has been known for improving the transparency of the polycarbonate-polyorganosiloxane copolymer (see Patent Documents 4 and 5). However, the method has involved a problem in that the impact resistance of the copolymer reduces.

In addition, the following attempt has been made in Patent Document 6. Two kinds of polycarbonate-polyorganosiloxane copolymers having different light transmittances are blended to improve transparency while maintaining excellent impact resistance. However, the transparency cannot be said to be sufficient. As described above, it has been difficult to achieve compatibility between excellent transparency and excellent impact resistance, in particular, impact resistance under low temperature in a conventional polycarbonate-polyorganosiloxane copolymer.

CITATION LIST

Patent Documents

[Patent Document 1] JP 2662310 B2
[Patent Document 2] JP 2011-21127 A
[Patent Document 3] JP 2012-246430 A
[Patent Document 4] JP 8-81620 A
[Patent Document 5] JP 2011-46911 A
[Patent Document 6] JP 2006-523243 A

SUMMARY OF INVENTION

Technical Problem

An object of the present invention is to provide a polycarbonate-polyorganosiloxane copolymer having transparency and excellent impact resistance, in particular, impact resistance under low temperature.

Solution to Problem

The inventors of the present invention have found that the object is achieved by controlling the molecular weight distribution of a polyorganosiloxane in a polycarbonate-polyorganosiloxane copolymer.

That is, the present invention relates to the following items 1 to 13.

1. A polycarbonate-polyorganosiloxane copolymer, including:
   a polycarbonate block (A) including a repeating unit represented by the following general formula (I); and
   a polyorganosiloxane block (B) including a repeating unit represented by the following general formula (II),
   in which in a differential molecular weight distribution curve obtained from measurement of the polyorganosiloxane block (B) by gel permeation chromatography using the polystyrene calibration curve, the curve having the axis of abscissa indicating a logarithmic value log(M) of a molecular weight M and the axis of ordinate indicating dw/d log(M) obtained by differentiating a concentration fraction w with respect to the logarithmic value log(M) of the molecular weight,
   (1) a dw/d log(M) value becomes maximum in the range of $3.4 \leq \log(M) \leq 4.0$, and
   (2) in the differential molecular weight distribution curve, a ratio of a value obtained by integrating the dw/d log(M) value over the range of $4.0 \leq \log(M) \leq 4.5$ to a value obtained by integrating the dw/d log(M) value over the entire range of the log(M) is 6% to 40%:

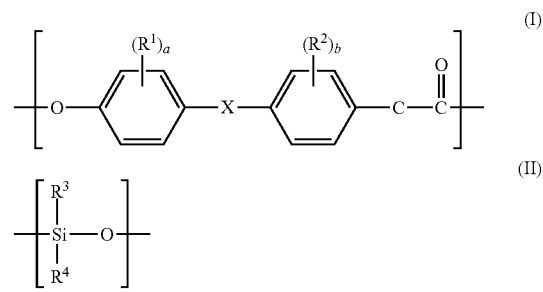

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and a and b each independently represent an integer of 0 to 4.

2. The polycarbonate-polyorganosiloxane copolymer according to Item 1, in which the polyorganosiloxane block (B) has an average chain length of 20 to 85.

3. The polycarbonate-polyorganosiloxane copolymer according to Item 1 or 2, in which the content of the polyorganosiloxane block (B) is 0.5 mass % to 20.0 mass % of the polycarbonate-polyorganosiloxane copolymer.
4. The polycarbonate-polyorganosiloxane copolymer according to any one of Items 1 to 3, in which the polycarbonate-polyorganosiloxane copolymer has a viscosity-average molecular weight of 12,000 to 40,000.
5. The polycarbonate-polyorganosiloxane copolymer according to any one of Items 1 to 4, in which in the general formula (I), a and b each represent 0, and X represents a single bond or an alkylene group having 1 to 8 carbon atoms.
6. The polycarbonate-polyorganosiloxane copolymer according to any one of Items 1 to 5, in which in the general formula (I), a and b each represent 0, and X represents an alkylene group having 3 carbon atoms.
7. The polycarbonate-polyorganosiloxane copolymer according to any one of Items 1 to 6, in which in the general formula (II), $R^3$ and $R^4$ each represent a methyl group.
8. A molded article, which is obtained by molding the polycarbonate-polyorganosiloxane copolymer of any one of Items 1 to 7.
9. A method of producing the polycarbonate-polyorganosiloxane copolymer of any one of Items 1 to 7, the method comprising using a polyorganosiloxane represented by the following general formula (ii) or (iii) as a raw material:

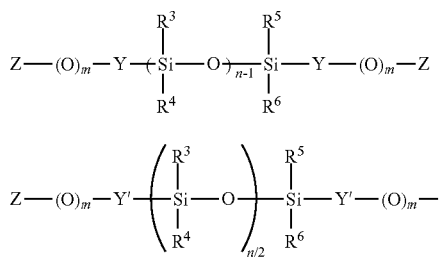

wherein $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, Y and Y' each independently represent a single bond, or an organic residue including —C(=O)—, an aliphatic moiety, or an aromatic moiety, the organic residue being bonded to Si and O or to Si and Z, n represents an average number of repetitions, m represents 0 or 1, Z each independently represent a halogen, —$R^7$OH, —$R^7$COOH, —$R^7$NH$_2$, —$R^7$NHR$^8$, —COOH, or —SH, $R^7$ represents a linear, branched, or cyclic alkylene group, an aryl-substituted alkylene group, an aryl-substituted alkylene group that may have an alkoxy group on a ring thereof, an arylene group that may be substituted, or an arylene alkyl-substituted aryl group, $R^8$ represents an alkyl group, an alkenyl group, an aryl group, or an aralkyl group, Z' each independently represent —$R^7$O—, —$R^7$COO—, —$R^7$NH—, —COO—, or —S—, $R^7$ represents a linear, branched, or cyclic alkylene group, an aryl-substituted alkylene group, an aryl-substituted alkylene group that may have an alkoxy group on a ring thereof, an arylene group that may be substituted, or an arylene alkyl-substituted aryl group, and β represents a divalent group derived from a diisocyanate compound or a divalent group derived from a dicarboxylic acid, the raw material polyorganosiloxane satisfying the following (1) and (2):
in a differential molecular weight distribution curve obtained from measurement of the polyorganosiloxane by gel permeation chromatography using the polystyrene calibration curve, the curve having an axis of abscissa indicating a logarithmic value log(M) of a molecular weight M and an axis of ordinate indicating dw/d log(M) obtained by differentiating a concentration fraction w with respect to the logarithmic value log(M) of the molecular weight,
(1) a dw/d log(M) value becomes maximum in a range of 3.45≤log(M)≤4.0, and
(2) in the differential molecular weight distribution curve, a ratio of a value obtained by integrating the dw/d log(M) value over a range of 4.0≤log(M)≤4.5 to a value obtained by integrating the dw/d log(M) value over the entire range of the log(M) is 6% or more and 40% or less.
10. The method of producing the polycarbonate-polyorganosiloxane copolymer according to Item 9, wherein in the general formula (ii) or (iii), an average chain length n is 20 to 85.
11. The method of producing the polycarbonate-polyorganosiloxane copolymer according to Item 9 or 10, wherein in the general formula (ii) or (iii), $R^3$ and $R^4$ each represent a methyl group.
12. A polyorganosiloxane, which is represented by the following general formula (ii) or (iii):

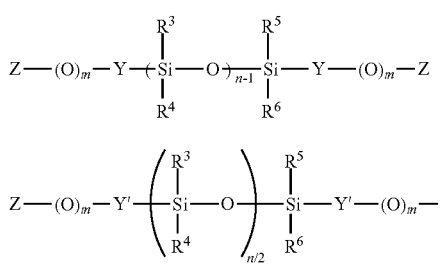

wherein $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, Y and Y' each independently represent a single bond, or an organic residue comprising —C(=O)—, an aliphatic moiety, or an aromatic moiety, the organic residue being bonded to Si and O or to Si and Z, n represents an average number of repetitions, m represents 0 or 1, Z each independently represent a halogen, —$R^7$OH, —$R^7$COOH, —$R^7$NH$_2$, —$R^7$NHR$^8$, —COOH, or —SH, $R^7$ represents a linear, branched, or cyclic alkylene group, an aryl-substituted alkylene group, an aryl-substituted alkylene group that may have an alkoxy group on a ring thereof, an arylene group that may be substituted, or an arylene alkyl-substituted aryl group, $R^8$ represents an alkyl group, an alkenyl group, an aryl group, or an aralkyl group, Z' each independently represent —$R^7$O—, —$R^7$COO—, —$R^7$NH—, —COO—, or —S—, $R^7$ represents a linear, branched, or cyclic alkylene group, an aryl-substituted alkylene group, an aryl-substituted alkylene group that may have an alkoxy group on a ring thereof, an arylene group that may be substituted, or an arylene alkyl-substituted aryl group, and β represents a divalent group derived from a diisocyanate compound or a divalent group derived from a dicarboxylic acid, the polyorganosiloxane satisfying the following (1) and (2):

in a differential molecular weight distribution curve obtained from measurement of the polyorganosiloxane by gel permeation chromatography using the polystyrene calibration curve, the curve having an axis of abscissa indicating a logarithmic value log(M) of a molecular weight M and an axis of ordinate indicating dw/d log(M) obtained by differentiating a concentration fraction w with respect to the logarithmic value log(M) of the molecular weight, (1) a dw/d log(M) value becomes maximum in a range of 3.4≤log(M)≤4.0, and (2) in the differential molecular weight distribution curve, a ratio of a value obtained by integrating the dw/d log(M) value over a range of 4.0≤log(M)≤4.5 to a value obtained by integrating the dw/d log(M) value over an entire range of the log(M) is 6% or more and 40% or less.

13. The polyorganosiloxane according to Item 12, wherein in the general formula (ii) or (iii), an average chain length n is 20 to 85.

Advantageous Effects of Invention

In the present invention, the polycarbonate-polyorganosiloxane copolymer having low-temperature impact resistance comparable to that of a copolymer of a polycarbonate and a high-molecular weight polyorganosiloxane while maintaining the same level of transparency as that of a copolymer of a polycarbonate and a low-molecular weight polyorganosiloxane can be obtained by controlling the molecular weight distribution of a polyorganosiloxane in the polycarbonate-polyorganosiloxane copolymer.

BRIEF DESCRIPTION OF DRAWINGS

FIG. 1 is a graph showing an example of the differential molecular weight distribution curve of a polyorganosiloxane to be used as a raw material in the present invention.

DESCRIPTION OF EMBODIMENTS

A polycarbonate-polyorganosiloxane copolymer of the present invention includes: a polycarbonate block (A) including a repeating unit represented by the following general formula (I); and a polyorganosiloxane block (B) including a repeating unit represented by the following general formula (II).

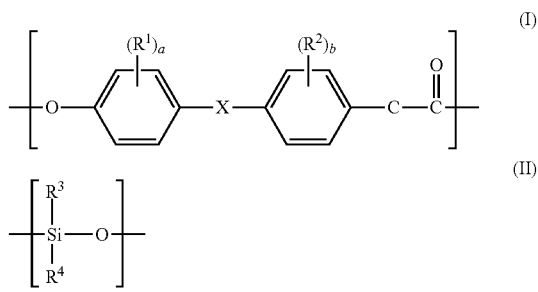

In the formula (I), $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, and a and b each independently represent an integer of 0 to 4.

In the formula (II), $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms.

Examples of the halogen atom that $R^1$ and $R^2$ in the general formula (I) each independently represent include a fluorine atom, a chlorine atom, a bromine atom, and an iodine atom.

Examples of the alkyl group that $R^1$ and $R^2$ each independently represent include a methyl group, an ethyl group, a n-propyl group, an isopropyl group, various butyl groups ("various" means that a linear group and any branched group are included, and the same applies hereinafter), various pentyl groups, and various hexyl groups. An example of the alkoxy group that $R^1$ and $R^2$ each independently represent is an alkoxy group whose alkyl group moiety is the alkyl group described above.

The alkylene group represented by X is, for example, a methylene group, an ethylene group, a trimethylene group, a tetramethylene group, or a hexamethylene group, and is preferably an alkylene group having 1 to 5 carbon atoms. Examples of the alkylidene group represented by X include an ethylidene group and an isopropylidene group. The cycloalkylene group represented by X is, for example, a cyclopentanediyl group, a cyclohexanediyl group, or a cyclooctanediyl group, and is preferably a cycloalkylene group having 5 to 10 carbon atoms. The cycloalkylidene group represented by X is, for example, a cyclohexylidene group, a 3,5,5-trimethylcyclohexylidene group, or a 2-adamantylidene group, and is preferably a cycloalkylidene group having 5 to 10 carbon atoms, more preferably a cycloalkylidene group having 5 to 8 carbon atoms. As an aryl moiety of the arylalkylene group represented by X, there are given, for example, aryl groups each having 6 to 14 ring-forming carbons such as a phenyl group, a naphthyl group, a biphenyl group, and an anthryl group. As an aryl moiety of the arylalkylidene group represented by X, there are given, for example, aryl groups each having 6 to 14 ring-forming carbons such as a phenyl group, a naphthyl group, a biphenyl group, and an anthryl group.

a and b each independently represent an integer of 0 to 4, preferably 0 to 2, more preferably 0 or 1.

Among them, the following is suitable: a repeating unit in which a and b each represent 0, and X represents a single bond or an alkylene group having 1 to 8 carbon atoms, or a repeating unit in which a and b each represent 0, and X represents an alkylene group having 3 carbon atoms, particularly an isopropylidene group.

Examples of the halogen atom represented by $R^3$ or $R^4$ in the general formula (II) include a fluorine atom, a chlorine atom, a bromine atom, and an iodine atom. Examples of the alkyl group represented by $R^3$ or $R^4$ include a methyl group, an ethyl group, a n-propyl group, an isopropyl group, various butyl groups ("various" means that a linear group and any branched group are included, and the same applies hereinafter), various pentyl groups, and various hexyl groups. An example of the alkoxy group represented by $R^3$ or $R^4$ is an alkoxy group whose alkyl group moiety is the alkyl group described above. Examples of the aryl group represented by $R^3$ or $R^4$ include a phenyl group and a naphthyl group.

It should be noted that $R^3$ and $R^4$ each preferably represent a hydrogen atom, an alkyl group having 1 to 6 carbon atoms, an alkoxy group having 1 to 6 carbon atoms, or an aryl group having 6 to 12 carbon atoms, and each more preferably represent a methyl group.

The content of the polyorganosiloxane block (B) including a repeating unit represented by the general formula (II) in the PC-POS copolymer of the present invention is preferably 0.5 to 20 mass %, more preferably 1.5 to 15 mass % of the polycarbonate-polyorganosiloxane copolymer. When the content of the polyorganosiloxane block (B) is less than 0.5 mass %, low-temperature impact resistance is not sufficiently obtained, and when the content is more than 20 mass %, a reduction in heat resistance is observed.

The polyorganosiloxane block (B) including a repeating unit represented by the general formula (II) in the PC-POS copolymer of the present invention is preferably represented by the following general formula (II').

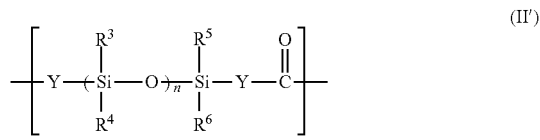

[In the formula, $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, Y represents a single bond, or an organic residue including —C(═O)—, an aliphatic moiety, or an aromatic moiety, the organic residue being bonded to Si and O or to Si and Z, and n represents an average number of repetitions.]

$R^3$ and $R^4$ are as described above, and $R^5$ and $R^6$ are the same as $R^3$ and $R^4$. $R^3$ to $R^6$ each preferably represent a hydrogen atom, an alkyl group having 1 to 6 carbon atoms, an alkoxy group having 1 to 6 carbon atoms, or an aryl group having 6 to 12 carbon atoms, and each more preferably represent a methyl group. Y preferably represents a residue of a phenol-based compound having an alkyl group, and more preferably represents an organic residue derived from allylphenol or an organic residue derived from eugenol. It should be noted that Y that represents a single bond means a bond for bonding a group adjacent to Y.

It is also preferred that the polyorganosiloxane block (B) including a repeating unit represented by the general formula (II) in the PC-POS copolymer of the present invention have a structure represented by the following general formula (II'').

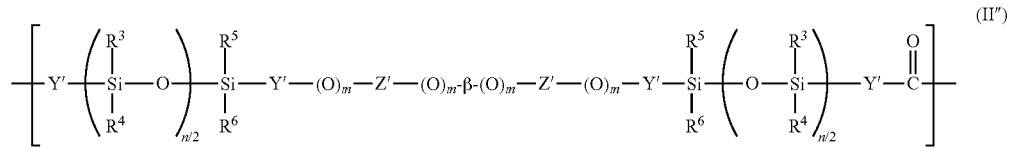

In the formula (II''), $R^3$ to $R^6$ and n are the same as those in the general formula (II'), and preferred ones thereof are also the same as those in the general formula (II'). Y' is the same as Y in the general formula (II'), and preferred ones thereof are also the same as those in the general formula (II'). m represents 0 or 1. Z' represents —$R^7$O—, —$R^7$COO—, —$R^7$NH—, —COO—, or —S—, and $R^7$ represents a linear, branched, or cyclic alkylene group, an aryl-substituted alkylene group, an aryl-substituted alkylene group that may have an alkoxy group on a ring thereof, an arylene group that may be substituted, or an arylene alkyl-substituted aryl group.

In addition, β represents a divalent group derived from a diisocyanate compound or a divalent group derived from a dicarboxylic acid. Specific examples of the divalent group derived from a diisocyanate compound and the divalent group derived from a dicarboxylic acid are described later.

The average chain length n of the polyorganosiloxane block (B) in the PC-POS copolymer of the present invention is preferably 20 to 85, more preferably 20 to 75, still more preferably 20 to 60. The average chain length is calculated by nuclear magnetic resonance (NMR) measurement. When the average chain length n is 20 or more, impact resistance at low temperature is sufficiently obtained. In addition, when the average chain length n is 85 or less, a copolymer excellent in transparency can be obtained.

<Polyorganosiloxane>

The polyorganosiloxane block (B) including a repeating unit represented by the following general formula (II) for forming the polycarbonate-polyorganosiloxane copolymer of the present invention has a feature in that in a differential molecular weight distribution curve obtained from measurement of the polyorganosiloxane block (B) by gel permeation chromatography using the polystyrene calibration curve, the curve having an axis of abscissa indicating a logarithmic value log(M) of a molecular weight M and an axis of ordinate indicating dw/d log(M) obtained by differentiating a concentration fraction w with respect to the logarithmic value log(M) of the molecular weight, (1) a dw/d log(M) value becomes maximum in a range of $3.4 \leq \log(M) \leq 4.0$, and (2) in the differential molecular weight distribution curve, a ratio of a value obtained by integrating the dw/d log(M) value over a range of $4.0 \leq \log(M) \leq 4.5$ to a value obtained by integrating the dw/d log(M) value over an entire range of the log(M) is 6% or more and 40% or less.

In order that the polyorganosiloxane block (B) for forming the polycarbonate-polyorganosiloxane copolymer of the present invention may have the foregoing feature, a polyorganosiloxane represented by the following general formula (ii) or (iii) to be used as a raw material needs to have the characteristics (1) and (2).

Y and Y' each preferably represent a residue of a phenol-based compound having an alkyl group, and each more preferably represent an organic residue derived from allylphenol or an organic residue derived from eugenol. It should be noted that Y and Y' that represent single bonds mean bonds for bonding groups adjacent to Y and Y'.

In addition, β represents a divalent group derived from a diisocyanate compound or a divalent group derived from a dicarboxylic acid, and examples thereof include divalent groups represented by the following general formulae (3-1) to (3-5).

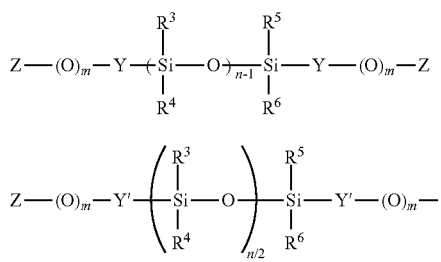

(ii)

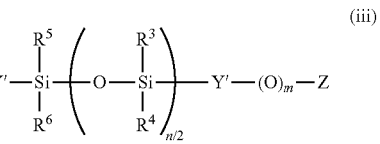

(iii)

[In the formulae (ii) and (iii), $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, Y and Y' each independently represent a single bond, or an organic residue including —C(=O)—, an aliphatic moiety or an aromatic moiety, the organic residue being bonded to Si and O or to Si and Z, n represents an average number of repetitions, m represents 0 or 1, Z each independently represent a halogen, —$R^7$OH, —$R^7$COOH, —$R^7$NH$_2$, —$R^7$NHR$^8$, —COOH, or —SH, $R^7$ represents a linear, branched, or cyclic alkylene group, an aryl-substituted alkylene group, an aryl-substituted alkylene group that may have an alkoxy group on a ring thereof, an arylene group that may be substituted, or an arylene alkyl-substituted aryl group, $R^8$ represents an alkyl group, an alkenyl group, an aryl group, or an aralkyl group, Z' each independently represent —$R^7$O—, —$R^7$COO—, —$R^7$NH—, —COO—, or —S—, $R^7$ represents a linear, branched, or cyclic alkylene group, an aryl-substituted alkylene group, an aryl-substituted alkylene group that may have an alkoxy group on a ring thereof, an arylene group that may be substituted, or an arylene alkyl-substituted aryl group, and β represents a divalent group derived from a diisocyanate compound or a divalent group derived from a dicarboxylic acid.]

It should be noted that the arylene alkyl-substituted aryl group represented by Z or Z' means that a terminal aryl group out of the two aryl groups of Z is bonded to a hydroxyl group OH as represented by the general formulae (1-6) and (1-11) to be described later.

$R^3$ and $R^4$ are as described above, and $R^5$ and $R^6$ are the same as $R^3$ and $R^4$. $R^3$ to $R^6$ each preferably represent a hydrogen atom, an alkyl group having 1 to 6 carbon atoms, an alkoxy group having 1 to 6 carbon atoms, or an aryl group having 6 to 12 carbon atoms, and each more preferably represent a methyl group.

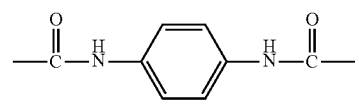

(3-1)

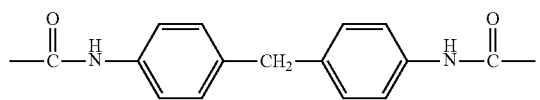

(3-2)

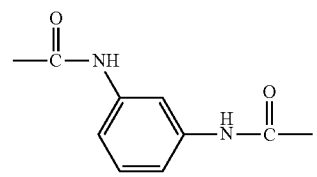

(3-3)

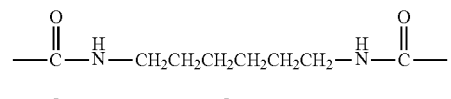

(3-4)

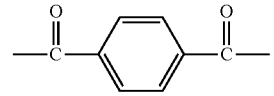

(3-5)

In addition to the polyorganosiloxane shown above, polyorganosiloxane compounds disclosed in the following documents may also be suitably used: JP 2013-523938 A, JP 4-225059 A, JP 2006-518803 A, WO 2013/115604 A1, and the like.

The average chain length n of the polyorganosiloxane represented by the general formula (ii) or (iii) is preferably 20 to 85, more preferably 20 to 75, still more preferably 20 to 60. The average chain length is calculated by nuclear magnetic resonance (NMR) measurement. When the average chain length n is 20 or more, the impact resistance at low temperature is sufficiently obtained. In addition, when the average chain length n is 85 or less, a copolymer excellent in transparency can be obtained.

A GPC apparatus for obtaining the measured values of the molecular weight and molecular weight distribution of the polyorganosiloxane represented by the general formula (ii) or (iii) is not particularly limited, and a GPC apparatus that is generally on the market such as a GPC measuring machine with internal refractive index (RI) detector "HLC-8200" manufactured by Tosoh Corporation can be utilized. In particular, a product obtained by coupling "TSK-GEL G4000HXL" and "TSK-GEL G2000HXL" manufactured by Tosoh Corporation is used as a GPC column. A column temperature is set to 40° C., tetrahydrofuran (THF) is used as an eluent, and measurement is performed at a flow rate of 1.0 ml/min. A standard polystyrene manufactured by Tosoh Corporation is used to obtain a calibration curve. The logarithmic value of a molecular weight thus obtained is referred to as "logarithmic molecular weight (log(M))."

In the time curve of an intensity distribution detected with the RI detector of the GPC apparatus (generally referred to as "elution curve"), an elution time is converted into a molecular weight by using the calibration curve obtained from the substance having a known molecular weight. Here, the intensity detected with the RI is in proportion to a component concentration, and hence a concentration fraction at each elution time is determined by determining an intensity area when the total area of the elution curve is set to 100%. An integral molecular weight distribution curve can be obtained by sequentially integrating the concentration fraction, and plotting the logarithmic value of the molecular weight (log(M)) along an axis of abscissa and the integrated value of the concentration fraction (w) along an axis of ordinate.

Subsequently, a differential molecular weight distribution curve can be obtained by determining the differential value of the curve at each logarithmic value of the molecular weight (i.e., the gradient of the integral molecular weight distribution curve), and plotting the logarithmic value of the molecular weight (log(M)) along an axis of abscissa and the differential value (dw/d log(M)) along an axis of ordinate. Therefore, a differential molecular weight distribution means a value obtained by differentiating the concentration fraction (w) with respect to the logarithmic value of the molecular weight (log(M)), i.e., "dw/d log(M)." The differential molecular weight distribution dw/d log(M) at a specific log(M) can be read from the differential molecular weight distribution curve. It should be noted that in the case of a polyorganosiloxane blend obtained by blending a plurality of polyorganosiloxanes as well, a differential molecular weight distribution curve can be obtained by the same approach after the measurement of the polyorganosiloxane blend by a GPC method.

In the present invention, (1) the dw/d log(M) value becomes maximum in the range of $3.4 \leq \log(M) \leq 4.0$, preferably in the range of $3.5 \leq \log(M) \leq 3.8$. The maximum value of the differential molecular weight distribution dw/d log(M) refers to a peak top in the differential molecular weight distribution curve. When the value in the (1) is less than 3.4, the following result is obtained: the copolymer is poor in low-temperature impact resistance. When the value is more than 4.0, its transparency tends to reduce.

In the present invention, (2) in the differential molecular weight distribution curve, the ratio of a value obtained by integrating the dw/d log(M) value over the range of $4.0 \leq \log(M) \leq 4.5$ to a value obtained by integrating the dw/d log(M) value over the entire range of the log(M) is 6% to 40%, preferably 6.5% to 30%. When the ratio is less than 6%, the following result is obtained: the copolymer is poor in low-temperature impact resistance. When the ratio is more than 40%, its transparency tends to reduce. Here, the ratio of the value obtained by integrating the dw/d log(M) value over the range of $4.0 \leq \log(M) \leq 4.5$ to the value obtained by integrating the dw/d log(M) value over the entire range of the log(M) refers to the ratio at which a component having a log(M) of 4.0 to 4.5 is present with respect to the entirety of the PDMS in the molecular weight distribution of the PDMS.

Examples of the polyorganosiloxane represented by the general formula (ii) are shown below.

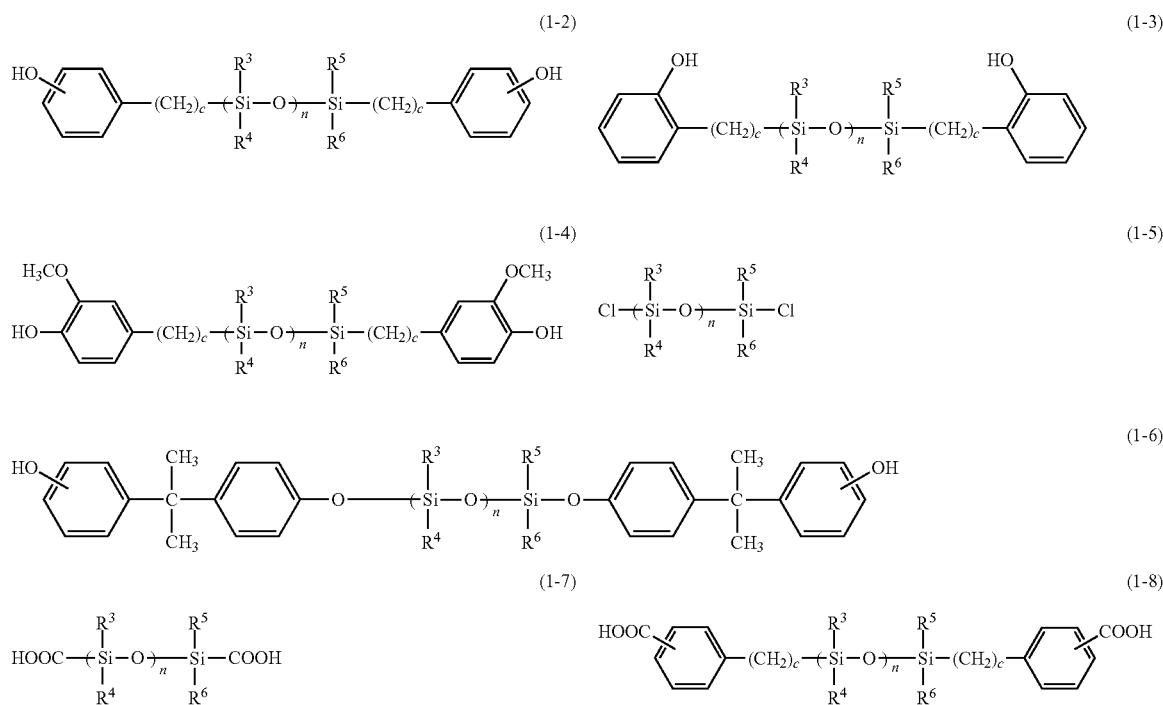

-continued

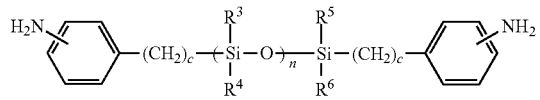
(1-9)

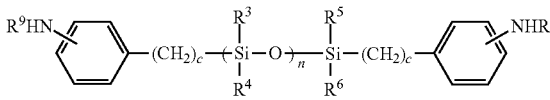
(1-10)

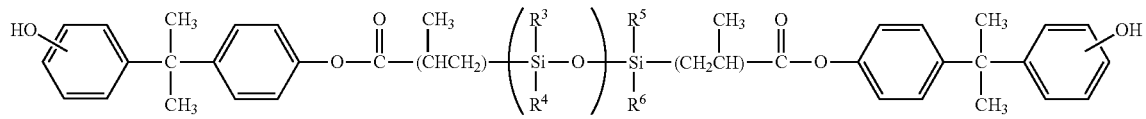
(1-11)

In the general formulae (1-2) to (1-11), $R^3$ to $R^6$ and n are as described above, and preferred ones thereof are also the same as those described above. In addition, $R^9$ represents an alkyl group, an alkenyl group, an aryl group, or an aralkyl group, and c represents a positive integer and typically represents an integer of 1 to 6. Furthermore, $R^9$ preferably represents an alkyl group, an alkenyl group, an aryl group, or an aralkyl group.

Among them, a phenol-modified polyorganosiloxane represented by the general formula (1-2) is preferred from the viewpoint of the ease of polymerization upon production of the polycarbonate-polyorganosiloxane copolymer. In addition, α,ω-bis[3-(o-hydroxyphenyl)propyl]polydimethylsiloxane as one kind of the compounds each represented by the general formula (1-3) or α,ω-bis[3-(4-hydroxy-3-methoxyphenyl)propyl]polydimethylsiloxane as one kind of the compounds each represented by the general formula (1-4) is preferred from the viewpoint of the ease of availability.

A method of producing a crude polyorganosiloxane to be used in the present invention is not particularly limited. According to, for example, a method described in JP 11-217390 A, the crude polyorganosiloxane can be obtained by: causing cyclotrisiloxane and disiloxane to react with each other in the presence of an acid catalyst to synthesize α,ω-dihydrogen organopentasiloxane; and then subjecting a phenolic compound (such as 2-allylphenol, 4-allylphenol, eugenol, or 2-propenylphenol) or the like to an addition reaction with the α,ω-dihydrogen organopentasiloxane in the presence of a catalyst for a hydrosilylation reaction. In addition, according to a method described in JP 2662310 B2, the crude polyorganosiloxane can be obtained by: causing octamethylcyclotetrasiloxane and tetramethyldisiloxane to react with each other in the presence of sulfuric acid (acid catalyst); and subjecting a phenolic compound or the like to an addition reaction with the resultant α,ω-dihydrogen organopolysiloxane in the presence of the catalyst for a hydrosilylation reaction in the same manner as in the foregoing. It should be noted that the chain length n of the α,ω-dihydrogen organopolysiloxane can be appropriately adjusted depending on a polymerization condition therefor before its use, or a commercially available α,ω-dihydrogen organopolysiloxane may be used.

Examples of the catalyst for a hydrosilylation reaction include transition metal-based catalysts. Among them, a platinum-based catalyst is preferably used in terms of a reaction rate and selectivity. Specific examples of the platinum-based catalyst include chloroplatinic acid, a solution of chloroplatinic acid in an alcohol, an olefin complex of platinum, a complex of platinum and a vinyl group-containing siloxane, platinum-supported silica, and platinum-supported activated carbon.

An adsorbent is preferably caused to adsorb and remove a transition metal derived from a transition metal-based catalyst used as the catalyst for a hydrosilylation reaction in the crude polyorganosiloxane by bringing the crude polyorganosiloxane into contact with the adsorbent.

An adsorbent having an average pore diameter of, for example, 1,000 Å or less can be used as the adsorbent. When the average pore diameter is 1,000 Å or less, the transition metal in the crude polyorganosiloxane can be efficiently removed. From such viewpoint, the average pore diameter of the adsorbent is preferably 500 Å or less, more preferably 200 Å or less, still more preferably 150 Å or less, yet still more preferably 100 Å or less. In addition, from the same viewpoint, the adsorbent is preferably a porous adsorbent.

The adsorbent is not particularly limited as long as the adsorbent has the above-mentioned average pore diameter. For example, there may be used activated clay, acidic clay, activated carbon, synthetic zeolite, natural zeolite, activated alumina, silica, a silica-magnesia-based adsorbent, diatomaceous earth, and cellulose. Among them, preferred is at least one kind selected from the group consisting of activated clay, acidic clay, activated carbon, synthetic zeolite, natural zeolite, activated alumina, silica, and a silica-magnesia-based adsorbent.

After the adsorbent has been caused to adsorb the transition metal in the crude polyorganosiloxane, the adsorbent can be separated from the polyorganosiloxane by arbitrary separating means. Examples of the means for separating the adsorbent from the polyorganosiloxane include a filter and centrifugation. When the filter is used, a filter such as a membrane filter, a sintered metal filter, or a glass fiber filter can be used. Among them, the membrane filter is particularly preferably used.

The average particle diameter of the adsorbent is typically 1 μm to 4 mm, preferably 1 to 100 μm from the viewpoint of separating the adsorbent from the polyorganosiloxane after the adsorption of the transition metal.

When the adsorbent is used in the present invention, its usage amount is not particularly limited. A porous adsorbent can be used in an amount in the range of preferably 1 to 30 parts by mass, more preferably 2 to 20 parts by mass with respect to 100 parts by mass of the crude polyorganosiloxane.

It should be noted that when the crude polyorganosiloxane to be treated has so high a molecular weight that the crude polyorganosiloxane is not in a liquid state, the polyorganosiloxane may be heated to such a temperature as to be in a liquid state upon performance of the adsorption with the adsorbent and the separation of the adsorbent. Alternatively, the adsorption and the separation may be performed in a state in which the polyorganosiloxane is dissolved in a solvent such as methylene chloride or hexane.

A polyorganosiloxane having a desired molecular weight distribution is obtained by regulating its molecular weight distribution through, for example, the blending of a plurality of polyorganosiloxanes. With regard to the blending, a crude polyorganosiloxane having a desired molecular weight distribution can be obtained by blending a plurality of α,ω-dihydrogen organopolysiloxanes and then subjecting a phenol compound or the like to an addition reaction with the resultant in the presence of a catalyst for a hydrosilylation reaction. In addition, purification such as the removal of the catalyst for a hydrosilylation reaction may be performed after a plurality of crude polyorganosiloxanes have been blended. A plurality of polyorganosiloxanes after the purification may be blended. In addition, a molecular weight distribution can be appropriately adjusted depending on a polymerization condition at the time of the production of a polyorganosiloxane. In addition, a desired molecular weight distribution can be obtained by fractionating only part of existing polyorganosiloxanes through means such as various kinds of separation.

<Polycarbonate-Polyorganosiloxane Copolymer>

A known production method such as an interfacial polymerization method (phosgene method), a pyridine method, or an ester exchange method can be employed as a method of producing the PC-POS copolymer of the present invention. Particularly in the case of the interfacial polymerization method, the step of separating an organic phase containing the PC-POS copolymer and an aqueous phase containing an unreacted substance, a catalyst residue, or the like becomes easy, and hence the separation of the organic phase containing the PC-POS copolymer and the aqueous phase in each washing step based on alkali washing, acid washing, or pure water washing becomes easy. Accordingly, the PC-POS copolymer is efficiently obtained.

The method of producing the PC-POS copolymer is not particularly limited and the copolymer can be produced with reference to a known method of producing a PC-POS copolymer such as a method described in JP 2010-241943 A.

Specifically, the PC-POS copolymer can be produced by: dissolving an aromatic polycarbonate oligomer produced in advance and the polyorganosiloxane in a water-insoluble organic solvent (such as methylene chloride); adding an alkaline aqueous solution (such as an aqueous sodium hydroxide) of a dihydric phenol-based compound (such as bisphenol A) to the solution; and subjecting the mixture to an interfacial polycondensation reaction through the use of a tertiary amine (such as triethylamine) or a quaternary ammonium salt (such as trimethylbenzylammonium chloride) as a polymerization catalyst in the presence of a terminal stopper (a monohydric phenol such as p-t-butylphenol). In addition, the PC-POS copolymer can be produced by copolymerizing a polyorganosiloxane, a dihydric phenol, and phosgene, a carbonate, or a chloroformate.

As described above, the polyorganosiloxane represented by the formula (ii) or (iii) having the following characteristics is used as the polyorganosiloxane: when the axis of ordinate and axis of abscissa in a differential molecular weight distribution curve obtained from the results of measurement by the GPC method using the polystyrene calibration curve represent dw/d log(M) and log(M) (where w represents a concentration fraction and M represents a molecular weight), respectively, (1) a dw/d log(M) value becomes maximum in the range of 3.4≤log(M)≤4.0, and (2) in the differential molecular weight distribution curve, the ratio of a value obtained by integrating the dw/d log(M) value over the range of 4.0≤(M)≤4.5 to a value obtained by integrating the dw/d log(M) value over the entire range of the log(M) is 6% to 40%.

The polycarbonate oligomer can be produced through a reaction of a dihydric phenol and a carbonate precursor such as phosgene or triphosgene in an organic solvent such as methylene chloride, chlorobenzene, or chloroform. It should be noted that when the polycarbonate oligomer is produced by using an ester exchange method, the oligomer can also be produced through a reaction of a dihydric phenol and a carbonate precursor such as diphenyl carbonate.

A dihydric phenol represented by the following general formula (i) is preferably used as the dihydric phenol.

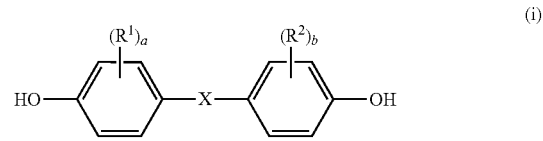

(i)

In the formula, $R^1$, $R^2$, a, b, and X are as described above.

Examples of the dihydric phenol represented by the general formula (i) include bis(hydroxyphenyl)alkane such as 2,2-bis(4-hydroxyphenyl)propane [bisphenol A], bis(4-hydroxyphenyl)methane, 1,1-bis(4-hydroxyphenyl)ethane, and 2,2-bis(4-hydroxy-3,5-dimethylphenyl)propane, 4,4'-dihydroxydiphenyl, a bis(4-hydroxyphenyl)cycloalkane, bis(4-hydroxyphenyl)oxide, bis(4-hydroxyphenyl)sulfide, bis(4-hydroxyphenyl)sulfone, bis(4-hydroxyphenyl)sulfoxide, and bis(4-hydroxyphenyl)ketone. One kind of those dihydric phenols may be used alone, or two or more kinds thereof may be used as a mixture.

Among them, bis(hydroxyphenyl)alkane-based dihydric phenols are preferred, and bisphenol A is more preferred. When bisphenol A is used as the dihydric phenol, the PC-POS copolymer in which X represents an isopropylidene group and a relationship of a=b=0 is satisfied in the general formula (i) is obtained.

Examples of the dihydric phenol other than bisphenol A include a bis(hydroxyaryl)alkane, a bis(hydroxyaryl)cycloalkane, a dihydroxyaryl ether, a dihydroxydiaryl sulfide, a dihydroxydiaryl sulfoxide, a dihydroxydiaryl sulfone, a dihydroxydiphenyl, a dihydroxydiarylfluorene, and a dihydroxydiaryladamantane. One kind of those dihydric phenols may be used alone, or two or more kinds thereof may be used as a mixture.

Examples of the bis(hydroxyaryl)alkane include bis(4-hydroxyphenyl)methane, 1,1-bis(4-hydroxyphenyl)ethane, 2,2-bis(4-hydroxyphenyl)butane, 2,2-bis(4-hydroxyphenyl)octane, bis(4-hydroxyphenyl)phenylmethane, bis(4-hydroxyphenyl)diphenylmethane, 2,2-bis(4-hydroxy-3-methylphenyl)propane, bis(4-hydroxyphenyl)naphthylmethane, 1,1-bis(4-hydroxy-3-t-butylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl)propane, and 2,2-bis(4-hydroxy-3,5-dibromophenyl)propane.

Examples of the bis(hydroxyaryl)cycloalkane include 1,1-bis(4-hydroxyphenyl)cyclopentane, 1,1-bis(4-hydroxyphenyl)cyclohexane, 1,1-bis(4-hydroxyphenyl)-3,5,5-trimethylcyclohexane, 2,2-bis(4-hydroxyphenyl)norbornene, and 1,1-bis(4-hydroxyphenyl)cyclododecane. Examples of the dihydroxyaryl ether include 4,4'-dihydroxydiphenyl ether and 4,4'-dihydroxy-3,3'-dimethylphenyl ether.

Examples of the dihydroxydiaryl sulfide include 4,4'-dihydroxydiphenyl sulfide and 4,4'-dihydroxy-3,3'-dimethyldiphenyl sulfide. Examples of the dihydroxydiaryl sulfoxide include 4,4'-dihydroxydiphenyl sulfoxide and 4,4'-dihydroxy-3,3'-dimethyldiphenyl sulfoxide. Examples of the dihydroxydiaryl sulfone include 4,4'-dihydroxydiphenyl sulfone and 4,4'-dihydroxy-3,3'-dimethyldiphenyl sulfone.

An example of the dihydroxydiphenyl is 4,4'-dihydroxydiphenyl. Examples of the dihydroxydiarylfluorene include 9,9-bis(4-hydroxyphenyl)fluorene and 9,9-bis(4-hydroxy-3-methylphenyl)fluorene. Examples of the dihydroxydiaryladamantane include 1,3-bis(4-hydroxyphenyl)adamantane, 2,2-bis(4-hydroxyphenyl)adamantane, and 1,3-bis(4-hydroxyphenyl)-5,7-dimethyladamantane.

Examples of the dihydric phenol other than the above-mentioned dihydric phenol include 4,4'-[1,3-phenylenebis(1-methylethylidene)]bisphenol, 10,10-bis(4-hydroxyphenyl)-9-anthrone, and 1,5-bis(4-hydroxyphenylthio)-2,3-dioxapentane.

In order to control the molecular weight of the PC-POS copolymer to be obtained, a terminal stopper can be used. Examples of the terminal stopper may include monohydric phenols such as phenol, p-cresol, p-tert-butylphenol, p-tert-octylphenol, p-cumylphenol, p-nonylphenol, m-pentadecylphenol, and p-tert-amylphenol. One kind of those monohydric phenols may be used alone, or two or more kinds thereof may be used in combination.

After the completion of the interfacial polycondensation, the liquid was appropriately left at rest to be separated into an aqueous phase and an organic solvent phase [separating step], the organic solvent phase is washed (preferably washed with a basic aqueous solution, an acidic aqueous solution, and water in order) [washing step], and the resultant organic phase is concentrated [concentrating step], and dried [drying step]. Thus, the PC-POS copolymer can be obtained.

The PC-POS copolymer of the present invention can be produced by appropriately using, for example, a molecular weight modifier so that its viscosity-average molecular weight may be a molecular weight intended for an application or product in which the copolymer is used. The copolymer is produced so as to have a viscosity-average molecular weight in the range of typically about 12,000 to 40,000, preferably about 15,000 to 30,000. When the viscosity-average molecular weight is less than 12,000, the strength of a molded article of the copolymer does not become sufficient. On the other hand, when the viscosity-average molecular weight is more than 40,000, the viscosity of the copolymer is so large that a temperature at the time of its injection molding or extrusion molding needs to be increased. Accordingly, its transparency is liable to reduce owing to its heat deterioration.

The viscosity of the PC-POS copolymer can be reduced by increasing its molding temperature. In that case, however, its molding cycle lengthens to result in poor economical efficiency. Moreover, when the temperature is excessively increased, the transparency tends to reduce owing to the heat deterioration of the PC-POS copolymer.

It should be noted that the viscosity-average molecular weight (Mv) is a value calculated from Schnell's equation ($[\eta]=1.23 \times 10^{-5} \times Mv^{0.83}$) by measuring the limiting viscosity $[\eta]$ of a methylene chloride solution at 20° C.

In the PC-POS copolymer of the present invention, various known additives can be blended into the polycarbonate resin composition as required. Examples of the additives include a reinforcing material, a filler, a stabilizer, an antioxidant, a UV absorber, an antistatic agent, a lubricant, a release agent, a dye, and a pigment as well as a flame retardant and an elastomer for improving impact resistance.

The PC-POS copolymer of the present invention can be blended with any known additive as required, and kneaded to obtain the PC resin composition.

The blending and the kneading can be performed by generally used methods, for example, methods each using a ribbon blender, a Henschel mixer, a Banbury mixer, a drum tumbler, a single-screw extruder, a twin-screw extruder, a Ko-Kneader, a multi-screw extruder, and the like.

It should be noted that the heating temperature in the kneading is generally selected from the range of 250 to 320° C.

Various conventionally known molding methods, for example, an injection molding method, an injection compression molding method, an extrusion molding method, a blow molding method, a press molding method, a vacuum molding method, and a foam molding method can be used for molding the resultant PC resin composition. Among them, injection molding with a mold temperature of 60° C. or more, preferably 80 to 120° C. is preferred.

In this case, the injection molding is performed at a resin temperature of generally about 280 to 360° C., preferably 280 to 330° C.

EXAMPLES

The present invention is more specifically described by way of Examples. However, the present invention is by no means limited by these Examples. In each of Examples, characteristic values and evaluation results were determined in the following manner.

(1) Gel Permeation Chromatography (GPC)

The GPC measurement of the polyorganosiloxane was carried out under the following conditions.
Test apparatus: TOSOH HLC 8220
Measurement condition: TOSOH TSK-GEL GHXL-L, G4000HXL, G2000HXL
Solvent: tetrahydrofuran (THF)
Column temperature: 40° C.
Flow rate: 1.0 ml/min
Detector: RI
Injection concentration: 0.2 w/v %
Injection amount: 0.1 ml Standard polystyrene manufactured by Tosoh Corporation was used to obtain a calibration curve.

The molecular weight distribution of a polyorganosiloxane in a polycarbonate-polydimethylsiloxane (PC-PDMS) was measured as described below. 3.9 g of the resultant PC-PDMS copolymer flake was added to methylene chloride so that a 10 mass % solution was obtained, and the flake was completely dissolved. While the solution was stirred with a magnetic stirrer, 30 ml of a 48 wt % aqueous solution of sodium hydroxide in methanol was added to the solution, and the mixture was stirred for 3 hours. After that, 30 ml of methylene chloride was added to the mixture and then the precipitated crystal (main component: bisphenol A) was filtered with pleated filter paper, followed by the washing of the crystal with methylene chloride. The methylene chloride solution of filtrate was washed with 15 vol % of a 0.03 mol/L aqueous NaOH twice. After that, the solution was washed with 15 vol % of a 0.2 N HCl and then washed with 15 vol % of pure water. The resultant methylene chloride solution was dried with a dryer and the resultant viscous liquid (main component: PDMS) was subjected to measurement by GPC. It was confirmed that the liquid had the same molecular weight distribution as that of the used polyorganosiloxane.

A differential molecular weight distribution curve can be obtained by such method as described below. First, the time curve of an intensity distribution detected with a RI detector (elution curve) was converted into a molecular weight distribution curve with respect to the logarithmic value of a molecular weight (log(M)) by using a calibration curve. Next, an integral molecular weight distribution curve with respect to the log(M) when the total area of the distribution curve was set to 100% was obtained. After that, a differential molecular weight distribution curve with respect to the log(M) can be obtained by differentiating the integral molecular weight distribution curve with respect to the log(M). It should be noted that a series of operations up to the acquisition of the differential molecular weight distribution curve can be typically performed with analysis software built in a GPC measuring apparatus. FIG. 1 is a graph showing an example of the differential molecular weight distribution curve to be obtained. The graph shows the log(M) value at which a dw/d log(M) value becomes maximum and shows a value obtained by integrating dw/d log(M) over the range of $4.0 \leq \log(M) \leq 4.5$ in a shaded area.

(2) Polydimethylsiloxane Content

The content of a polydimethylsiloxane was calculated by NMR measurement from the integrated value ratio of a methyl group of the polydimethylsiloxane.

(3) Viscosity-Average Molecular Weight of Polycarbonate-Polyorganosiloxane Copolymer A viscosity-average molecular weight (Mv) was calculated from the following equation (Schnell's equation) by using a limiting viscosity [η] determined through the measurement of the viscosity of a methylene chloride solution at 20° C. with an Ubbelohde-type viscometer.

$$[\eta] = 1.23 \times 10^{-5} \times Mv^{0.83}$$

Production of Polycarbonate Oligomer

Production Example

To a 5.6 mass % aqueous sodium hydroxide, 2,000 ppm of sodium dithionite with respect to bisphenol A (BPA) (to be dissolved later) was added. BPA was dissolved in the solution so that the concentration of BPA became 13.5 mass %. Thus, a solution of BPA in aqueous sodium hydroxide was prepared. The solution of BPA in aqueous sodium hydroxide, methylene chloride, and phosgene were continuously passed through a tubular reactor having an inner diameter of 6 mm and a tube length of 30 m at flow rates of 40 L/hr, 15 L/hr, and 4.0 kg/hr, respectively. The tubular reactor had a jacket portion and the temperature of a reaction liquid was kept at 40° C. or less by passing cooling water through the jacket. The reaction liquid which had exited the tubular reactor was continuously introduced into a baffled vessel-type reactor having an internal volume of 40 L provided with a sweptback blade, and then the solution of BPA in aqueous sodium hydroxide, a 25 mass % aqueous sodium hydroxide, water, and a 1 mass % aqueous solution of triethylamine were further added to the reactor at flow rates of 2.8 L/hr, 0.07 L/hr, 17 L/hr, and 0.64 L/hr, respectively, to thereby perform a reaction. The reaction liquid flowing out of the vessel-type reactor was continuously taken out, and then an aqueous phase was separated and removed by leaving the liquid at rest, followed by the collection of a methylene chloride phase.

The concentration of the polycarbonate oligomer thus obtained was 321 g/L and the concentration of a chloroformate group thereof was 0.73 mol/L.

Example 1

15 Liters of the polycarbonate oligomer solution produced as described above, 8.3 L of methylene chloride, 393 g of an allylphenol terminal-modified polydimethylsiloxane (PDMS) [having an average chain length n of 75, a log(M) at which dw/d log(M) became maximum of 3.8, and a ratio of a value obtained by integrating the dw/d log(M) value over the log(M) range of from 4.0 to 4.5 to a value obtained by integrating the dw/d log(M) value over the entire range of the log(M) (hereinafter, in Examples, the ratio is sometimes referred to as "ratio of a log(M) of from 4.0 to 4.5") of 24.4% (obtained by blending an allylphenol terminal-modified PDMS having an average chain length n of 34, a log(M) at which dw/d log(M) became maximum of 3.6, and a ratio of a log(M) of from 4.0 to 4.5 of 5.4%, and an allylphenol terminal-modified PDMS having an average chain length n of 92, a log(M) at which dw/d log(M) became maximum of 4.1, and a ratio of a log(M) of from 4.0 to 4.5 of 34.5%, at a mass ratio of 3:7)], and 5.8 mL of triethylamine were loaded into a 50-L vessel-type reactor provided with a baffle board, a paddle-type stirring blade, and a cooling jacket. 1,496 g of a 6.4 mass % aqueous sodium hydroxide was added to the mixture under stirring, and the polycarbonate oligomer and the allylphenol terminal-modified PDMS were caused to react with each other for 10 minutes.

A solution of p-t-butylphenol (PTBP) in methylene chloride (prepared by dissolving 70 g of PTBP in 0.3 L of methylene chloride) and a solution of BPA in aqueous sodium hydroxide (prepared by dissolving 1,099 g of BPA in an aqueous solution prepared by dissolving 648 g of NaOH and 2.0 g of sodium dithionite in 9.5 L of water) were added to the polymerization liquid, and the mixture was subjected to a polymerization reaction for 50 minutes.

10 L of methylene chloride was added to the resultant for dilution, and the mixture was stirred for 10 minutes. After that, the mixture was separated into an organic phase containing a polycarbonate, and an aqueous phase containing excess amounts of BPA and NaOH, and the organic phase was isolated.

A solution of a PC-PDMS in methylene chloride thus obtained was sequentially washed with 0.03 mol/L aqueous NaOH and 0.2 N hydrochloric acid in amounts of 15 vol % each with respect to the solution. Next, the solution was repeatedly washed with pure water until an electric conductivity in an aqueous phase after the washing became 0.01 µS/m or less.

A solution of the polycarbonate in methylene chloride obtained by the washing was concentrated and pulverized, and the resultant flake was dried under reduced pressure at 120° C. The flake had a PDMS amount of 6.5 mass %, a viscosity number measured in conformity with ISO 1628-4 (1999) of 47.4, and a viscosity-average molecular weight Mv of 17,700.

100 Parts by mass of the resultant PC-PDMS copolymer flake and 0.1 part by mass of IRGAFOS 168 (trade name, manufactured by ADEKA Corporation) as an antioxidant were mixed. The mixture was supplied to a vented single screw extruder, and was melt-kneaded at a resin temperature of 280° C. to provide a pellet sample for an evaluation. The pellet sample for an evaluation was dried at 120° C. for 8 hours, and was then subjected to injection molding with an injection molding machine at a molding resin temperature of 280° C. and a die temperature of 80° C. to produce a test piece for performing each test, followed by the performance of the following tests.

It is confirmed that the PDMS had the same molecular weight distribution as that of the used PDMS, by the GPC measurement of the PDMS in the PC-PDMS.

[Total Light Transmittance and Haze Value]

The total light transmittance of a test piece having a thickness of 3 mm was measured on the basis of ISO 13468 three times, its haze value was measured on the basis of ISO 14782 three times, and their respective averages were determined. Table 1 shows the results.

[Izod Impact Strength]

The notched Izod impact strength of a test piece having a thickness of 3 mm (about ⅛ inch) produced with an injection molding machine was measured at a measurement temperature of −40° C. in conformity with ASTM Standard D-256. Table 1 shows the result.

In addition, for each of Examples 2 to 9 to be described later, a test piece was similarly produced by using a PC-PDMS copolymer flake obtained in each of Examples, and its total light transmittance, haze value, and Izod impact strength were measured. Table 1 shows the results together.

Example 2

Production was performed in the same manner as in Example 1 except that the allylphenol terminal-modified PDMS used in Example 1 was changed to an allylphenol terminal-modified PDMS [having an average chain length n of 46, a log(M) at which dw/d log(M) became maximum of 3.7, and a ratio of a log(M) of from 4.0 to 4.5 of 10.3% (obtained by blending an allylphenol terminal-modified PDMS having an average chain length n of 34, a log(M) at which dw/d log(M) became maximum of 3.6, and a ratio of a log(M) of from 4.0 to 4.5 of 5.4%, and an allylphenol terminal-modified PDMS having an average chain length n of 92, a log(M) at which dw/d log(M) became maximum of 4.1, and a ratio of a log(M) of from 4.0 to 4.5 of 34.5%, at a mass ratio of 8:2)]. The resultant flake had a PDMS amount of 6.7 mass %, a viscosity number measured in conformity with ISO 1628-4 (1999) of 47.4, and a viscosity-average molecular weight Mv of 17,700.

Example 3

Production was performed in the same manner as in Example 1 except that: the allylphenol terminal-modified PDMS used in Example 1 was changed to an allylphenol terminal-modified PDMS [having an average chain length n of 57, a log(M) at which dw/d log(M) became maximum of 3.6, and a ratio of a log(M) of from 4.0 to 4.5 of 11.2% (obtained by blending an allylphenol terminal-modified PDMS having an average chain length n of 34, a log(M) at which dw/d log(M) became maximum of 3.6, and a ratio of a log(M) of from 4.0 to 4.5 of 5.4%, and an allylphenol terminal-modified PDMS having an average chain length n of 143, a log(M) at which dw/d log(M) became maximum of 4.3, and a ratio of a log(M) of from 4.0 to 4.5 of 42.9%, at a mass ratio of 8:2)]; and 50 g of PTBP was used. The resultant flake had a PDMS amount of 6.9 mass %, a viscosity number measured in conformity with ISO 1628-4 (1999) of 53.3, and a viscosity-average molecular weight of 20,300.

Example 4

Production was performed in the same manner as in Example 3 except that the amount of PTBP used in Example 3 was changed to 70 g. The resultant flake had a PDMS amount of 6.8 mass %, a viscosity number measured in conformity with ISO 1628-4 (1999) of 47.4, and a viscosity-average molecular weight of 17,700.

Example 5

Production was performed in the same manner as in Example 4 except that the amount of the allylphenol terminal-modified PDMS used in Example 4 was changed to 262 g. The resultant flake had a PDMS amount of 4.4 mass %, a viscosity number measured in conformity with ISO 1628-4 (1999) of 47.2, and a viscosity-average molecular weight of 17,600.

Example 6

Production was performed in the same manner as in Example 4 except that: the PDMS used in Example 4 was changed to an allylphenol terminal-modified PDMS [having an average chain length n of 67, a log(M) at which dw/d log(M) became maximum of 3.7, and a ratio of a log(M) of from 4.0 to 4.5 of 14.4% (obtained by blending an allylphenol terminal-modified PDMS having an average chain length n of 34, a log(M) at which dw/d log(M) became maximum of 3.6, and a ratio of a log(M) of from 4.0 to 4.5 of 5.4%, and an allylphenol terminal-modified PDMS having an average chain length n of 143, a log(M) at which dw/d log(M) became maximum of 4.3, and a ratio of a log(M) of from 4.0 to 4.5 of 42.9%, at a mass ratio of 7:3)]; and the amount of PTBP was changed to 50 g. The resultant flake had a PDMS amount of 6.6 mass %, a viscosity number measured in conformity with ISO 1628-4 (1999) of 53.3, and a viscosity-average molecular weight of 20,300.

Example 7

Production was performed in the same manner as in Example 4 except that: the allylphenol terminal-modified PDMS used in Example 4 was changed to an allylphenol terminal-modified PDMS [having an average chain length n of 40, a log(M) at which dw/d log(M) became maximum of 3.6, and a ratio of a log(M) of from 4.0 to 4.5 of 6.8% (obtained by blending an allylphenol terminal-modified PDMS having an average chain length n of 34, a log(M) at which dw/d log(M) became maximum of 3.6, and a ratio of a log(M) of from 4.0 to 4.5 of 5.4%, and an allylphenol terminal-modified PDMS having an average chain length n of 143, a log(M) at which dw/d log(M) became maximum of 4.3, and a ratio of a log(M) of from 4.0 to 4.5 of 42.9%, at a mass ratio of 9.5:0.5)]; and the amount of PTBP was changed to 51 g. The resultant flake had a PDMS amount of 6.7 mass %, a viscosity number measured in conformity with ISO 1628-4 (1999) of 52.0, and a viscosity-average molecular weight of 19,700.

Example 8

Production was performed in the same manner as in Example 4 except that the allylphenol terminal-modified PDMS used in Example 4 was changed to an allylphenol terminal-modified PDMS [having an average chain length n of 46, a log(M) at which dw/d log(M) became maximum of 3.6, and a ratio of a log(M) of from 4.0 to 4.5 of 8.3% (obtained by blending an allylphenol terminal-modified PDMS having an average chain length n of 34, a log(M) at which dw/d log(M) became maximum of 3.6, and a ratio of a log(M) of from 4.0 to 4.5 of 5.4%, and an allylphenol terminal-modified PDMS having an average chain length n of 143, a log(M) at which dw/d log(M) became maximum of 4.3, and a ratio of a log(M) of from 4.0 to 4.5 of 42.9%, at a mass ratio of 9:1)]. The resultant flake had a PDMS amount of 6.7 mass %, a viscosity number measured in conformity with ISO 1628-4 (1999) of 52.6, and a viscosity-average molecular weight of 20,000.

Example 9

Production was performed in the same manner as in Example 8 except that the amount of PTBP was changed to 70 g. The resultant flake had a PDMS amount of 6.8 mass %, a viscosity number measured in conformity with ISO 1628-4 (1999) of 46.8, and a viscosity-average molecular weight of 17,400.

Example 10

Production was performed in the same manner as in Example 1 except that the allylphenol terminal-modified PDMS used in Example 1 was changed to an allylphenol terminal-modified PDMS [having an average chain length n of 64, a log(M) at which dw/d log(M) became maximum of 3.8, and a ratio of a log(M) of from 4.0 to 4.5 of 18.4% (obtained by blending an allylphenol terminal-modified PDMS having an average chain length n of 34, a log(M) at which dw/d log(M) became maximum of 3.6, and a ratio of a log(M) of from 4.0 to 4.5 of 5.4%, and an allylphenol terminal-modified PDMS having an average chain length n of 92, a log(M) at which dw/d log(M) became maximum of 4.1, and a ratio of a log(M) of from 4.0 to 4.5 of 34.5%, at a mass ratio of 5:5)]. The resultant flake had a PDMS amount of 6.3 mass %, a viscosity number measured in conformity with ISO 1628-4 (1999) of 46.7, and a viscosity-average molecular weight Mv of 17,300.

Example 11

Production was performed in the same manner as in Example 1 except that the allylphenol terminal-modified PDMS used in Example 1 was changed to an allylphenol terminal-modified PDMS [having an average chain length n of 69, a log(M) at which dw/d log(M) became maximum of 3.8, and a ratio of a log(M) of from 4.0 to 4.5 of 21.3% (obtained by blending an allylphenol terminal-modified PDMS having an average chain length n of 34, a log(M) at which dw/d log(M) became maximum of 3.6, and a ratio of a log(M) of from 4.0 to 4.5 of 5.4%, and an allylphenol terminal-modified PDMS having an average chain length n of 92, a log(M) at which dw/d log(M) became maximum of 4.1, and a ratio of a log(M) of from 4.0 to 4.5 of 34.5%, at a mass ratio of 4:6)]. The resultant flake had a PDMS amount of 6.1 mass %, a viscosity number measured in conformity with ISO 1628-4 (1999) of 46.5, and a viscosity-average molecular weight Mv of 17,300.

Example 12

Production was performed in the same manner as in Example 1 except that the allylphenol terminal-modified PDMS used in Example 1 was changed to an allylphenol terminal-modified PDMS [having an average chain length n of 64, a log(M) at which dw/d log(M) became maximum of 3.8, and a ratio of a log(M) of from 4.0 to 4.5 of 21.2%]. The resultant flake had a PDMS amount of 6.3 mass %, a viscosity number measured in conformity with ISO 1628-4 (1999) of 46.5, and a viscosity-average molecular weight Mv of 17,300.

Example 13

Production was performed in the same manner as in Example 10 except that in Example 10, the amount of methylene chloride to be loaded together with the polycarbonate oligomer solution was changed to 12.1 L. The resultant flake had a PDMS amount of 6.2 mass %, a viscosity number measured in conformity with ISO 1628-4 (1999) of 46.3, and a viscosity-average molecular weight Mv of 17,200.

Example 14

Production was performed in the same manner as in Example 11 except that in Example 11, the amount of methylene chloride to be loaded together with the polycarbonate oligomer solution was changed to 14.2 L. The resultant flake had a PDMS amount of 5.8 mass %, a viscosity number measured in conformity with ISO 1628-4 (1999) of 48.3, and a viscosity-average molecular weight Mv of 18,000.

Example 15

Production was performed in the same manner as in Example 12 except that in Example 12, the amount of methylene chloride to be loaded together with the polycarbonate oligomer solution was changed to 14.5 L. The resultant flake had a PDMS amount of 6.4 mass %, a viscosity number measured in conformity with ISO 1628-4 (1999) of 46.1, and a viscosity-average molecular weight Mv of 17,100.

TABLE 1

| Examples | | 1 | 2 | 3 | 4 | 5 | 6 | 7 | 8 | 9 |
|---|---|---|---|---|---|---|---|---|---|---|
| Average chain length (n) | | 75 | 46 | 57 | 57 | 57 | 67 | 40 | 46 | 46 |
| log (M) at which dw/dlog (M) becomes maximum | | 3.8 | 3.7 | 3.6 | 3.6 | 3.6 | 3.7 | 3.6 | 3.6 | 3.6 |
| Ratio of log (M) of from 4.0 to 4.5 | % | 24.4 | 10.3 | 11.2 | 11.2 | 11.2 | 14.4 | 6.8 | 8.3 | 8.3 |
| PDMS content | wt % | 6.5 | 6.7 | 6.9 | 6.8 | 4.4 | 6.6 | 6.7 | 6.7 | 6.8 |
| Viscosity number (VN) | | 47.4 | 47.4 | 53.3 | 47.4 | 47.2 | 53.3 | 52.0 | 52.6 | 46.8 |
| Viscosity-average molecular weight (Mv) | | 17,700 | 17,700 | 20,300 | 17,700 | 17,600 | 20,300 | 19,700 | 20,000 | 17,400 |
| Izod impact strength at −40° C. | KJ/m$^2$ | 58 | 51 | 68 | 53 | 55 | 74 | 62 | 66 | 46 |
| Total light transmittance (3 mm) | % | 81.70 | 87.97 | 84.87 | 81.95 | 86.07 | 80.20 | 88.20 | 87.09 | 87.24 |
| Haze value (3 mm) | % | 3.73 | 1.97 | 3.07 | 3.4 | 2.5 | 6.2 | 0.73 | 0.97 | 1.07 |

TABLE 1-continued

| Example | | 10 | 11 | 12 | 13 | 14 | 15 |
|---|---|---|---|---|---|---|---|
| Average chain length (n) | | 64 | 69 | 64 | 64 | 69 | 64 |
| log (M) at which dw/dlog (M) becomes maximum | | 3.8 | 3.8 | 3.8 | 3.8 | 3.8 | 3.8 |
| Ratio of log (M) of from 4.0 to 4.5 | % | 18.4 | 21.3 | 21.2 | 18.4 | 21.3 | 21.2 |
| PDMS content | wt % | 6.3 | 6.1 | 6.3 | 6.2 | 5.8 | 6.4 |
| Viscosity number (VN) | | 46.7 | 46.5 | 46.5 | 46.3 | 48.3 | 46.1 |
| Viscosity-average molecular weight (Mv) | | 17,300 | 17,300 | 17,300 | 17,200 | 18,000 | 17,100 |
| Izod impact strength at −40° C. | KJ/m$^2$ | 54 | 54 | 54 | 52 | 53 | 52 |
| Total light transmittance (3 mm) | % | 85.60 | 84.40 | 85.87 | 86.07 | 86.97 | 85.63 |
| Haze value (3 mm) | % | 1.97 | 2.43 | 1.53 | 1.43 | 1.17 | 1.50 |

Comparative Example 1

Production was performed in the same manner as in Example 1 except that the allylphenol terminal-modified PDMS used in Example 1 was changed to an allylphenol terminal-modified PDMS having an average chain length n of 88, a log(M) at which dw/d log(M) became maximum of 4.1, and a ratio of a log(M) of from 4.0 to 4.5 of 34.5%. The resultant flake had a PDMS amount of 6.0 mass %, a viscosity number measured in conformity with ISO 1628-4 (1999) of 45.3, and a viscosity-average molecular weight of 16,700. A test piece was produced in the same manner as in Example 1 by using the resultant PC-PDMS copolymer flake, and its total light transmittance, haze value, and Izod impact strength were measured. Table 2 shows the results together. For each of Comparative Examples 2 to 4 to be described later, a test piece was produced in the same manner as in Example 1 by using a PC-PDMS copolymer flake obtained in each of Comparative Examples, and its total light transmittance, haze value, and Izod impact strength were measured. Table 2 shows the results together.

Comparative Example 2

Production was performed in the same manner as in Comparative Example 1 except that the allylphenol terminal-modified PDMS used in Comparative Example 1 was changed to an allylphenol terminal-modified PDMS having an average chain length n of 40, a log(M) at which dw/d log(M) became maximum of 3.6, and a ratio of a log(M) of from 4.0 to 4.5 of 5.4%. The resultant flake had a PDMS amount of 5.9 mass %, a viscosity number measured in conformity with ISO 1628-4 (1999) of 47.3, and a viscosity-average molecular weight of 17,500.

Comparative Example 3

Production was performed in the same manner as in Comparative Example 1 except that the allylphenol terminal-modified PDMS used in Comparative Example 1 was changed to an allylphenol terminal-modified PDMS [having an average chain length n of 46, a log(M) at which dw/d log(M) became maximum of 3.3, and a ratio of a log(M) of from 4.0 to 4.5 of 6.5% (obtained by blending an allylphenol terminal-modified PDMS having an average chain length n of 22, a log(M) at which dw/d log(M) became maximum of 4.26, and a ratio of a log(M) of from 4.0 to 4.5 of 0.32%, and an allylphenol terminal-modified PDMS having an average chain length n of 143, a log(M) at which dw/d log(M) became maximum of 3.3, and a ratio of a log(M) of from 4.0 to 4.5 of 42.9%, at a mass ratio of 8:2)]. The resultant flake had a PDMS amount of 6.6 mass %, a viscosity number measured in conformity with ISO 1628-4 (1999) of 47.4, and a viscosity-average molecular weight of 17,600.

Comparative Example 4

A PC-PDMS copolymer obtained by blending the PC-PDMS copolymer obtained in Comparative Example 1 and the PC-PDMS copolymer obtained in Comparative Example 2 at a mass ratio of 7:3 was used. 100 Parts by mass of the blended PC-PDMS copolymer flake was mixed with 0.1 part by mass of IRGAFOS 168 (trade name, manufactured by Adeka Corporation) as an antioxidant. The mixture was supplied to a vented single screw extruder, and was melt-kneaded at a resin temperature of 280° C. to provide a pellet sample for an evaluation. The pellet sample for an evaluation was dried at 120° C. for 8 hours, and was then subjected to injection molding with an injection molding machine at a molding resin temperature of 280° C. and a die temperature of 80° C. to produce a test piece for performing each test. Its total light transmittance, haze value, and Izod impact strength were measured in the same manner as in Example 1. Table 2 shows the results together.

Comparative Example 5

Production was performed in the same manner as in Example 1 except that the allylphenol terminal-modified PDMS used in Example 1 was changed to 151 g of an allylphenol terminal-modified PDMS having an average chain length n of 153, a log(M) at which dw/d log(M) became maximum of 4.3, and a ratio of a log(M) of from 4.0 to 4.5 of 42.9%. The resultant flake had a PDMS amount of 2.5 mass %, a viscosity number measured in conformity with ISO 1628-4 (1999) of 47.3, and a viscosity-average molecular weight of 17,500.

TABLE 2

| Comparative Examples | | 1 | 2 | 3 | 4 | 5 |
|---|---|---|---|---|---|---|
| Average chain length (n) | | 88 | 40 | 46 | — | 153 |
| log (M) at which dw/dlog (M) becomes maximum | | 4.1 | 3.6 | 3.3 | — | 4.3 |
| Ratio of log(M) of from 4.0 to 4.5 | % | 34.5 | 5.4 | 6.5 | — | 42.9 |
| PDMS content | wt % | 6.0 | 5.9 | 6.6 | 6.0 | 2.5 |
| Viscosity number (VN) | | 45.3 | 47.3 | 47.4 | 45.9 | 47.3 |
| Viscosity-average molecular weight (Mv) | | 16,700 | 17,500 | 17,600 | 17,800 | 17,500 |
| Izod impact strength at −40° C. | KJ/m$^2$ | 56 | 38 | 23 | 56 | 58* |
| Total light transmittance (3 mm) | % | 66.03 | 89.11 | 86.03 | 76.47 | 48.4 |
| Haze value (3 mm) | % | 19.93 | 0.63 | 2.97 | 6.47 | 66.6 |

*Measured at −30° C.

As is apparent from the tables, impact resistance at low temperature is obtained by using such a PDMS that a component having a log(M) of from 4.0 to 4.5 is present at 6% or more of the entirety of the PDMS in the molecular weight distribution of the PDMS, and the transparency of a molded article is improved by using a PDMS having a logarithmic value log(M) of a molecular weight at which a value (dw/d log(M)) obtained by differentiating a concentration fraction w with respect to the log(M) becomes maximum of 4 or less.

Such effects are special effects obtained by blending POS raw materials. When the above-mentioned molecular weight distribution of a POS is obtained by blending PC-POS copolymers, it is impossible to achieve both the impact resistance at low temperature and the transparency as the effects of the present invention. This is probably because of the following reason: in the case where the POS raw materials are blended prior to polymerization with a polycarbonate, the formation of a siloxane domain that reduces the transparency can be suppressed, or the size of the siloxane domain to be formed can be reduced, as compared to the case where the PC-POS copolymers are blended.

In addition, only a polyorganosiloxane can be extracted from a polyorganosiloxane copolymer by using a strongly alkaline aqueous solution such as a solution of sodium hydroxide in methanol.

INDUSTRIAL APPLICABILITY

According to the present invention, a polycarbonate-polyorganosiloxane copolymer having low-temperature impact resistance comparable to that of a copolymer of a polycarbonate and a high-molecular weight polyorganosiloxane while maintaining the same level of transparency as that of a copolymer of a polycarbonate and a low-molecular weight polyorganosiloxane can be obtained by using a polyorganosiloxane containing both the low-molecular weight and high-molecular weight polyorganosiloxanes.

The invention claimed is:
1. A polycarbonate-polyorganosiloxane copolymer, comprising:
a polycarbonate block (A) comprising a repeating unit represented by the following general formula (I); and
a polyorganosiloxane block (B) comprising a repeating unit represented by the following general formula (II), wherein in a differential molecular weight distribution curve obtained from measurement of the polyorganosiloxane block (B) by gel permeation chromatography using the polystyrene calibration curve, the curve having an axis of abscissa indicating a logarithmic value log(M) of a molecular weight M and an axis of ordinate indicating dw/d log(M) obtained by differentiating a concentration fraction w with respect to the logarithmic value log(M) of the molecular weight,
(1) a dw/d log(M) value becomes maximum in a range of 3.4≤log(M)≤4.0, and
(2) in the differential molecular weight distribution curve, a ratio of a value obtained by integrating the dw/d log (M) value over a range of 4.0≤log(M)≤4.5 to a value obtained by integrating the dw/d log(M) value over an entire range of the log(M) is 6% or more and 40% or less:

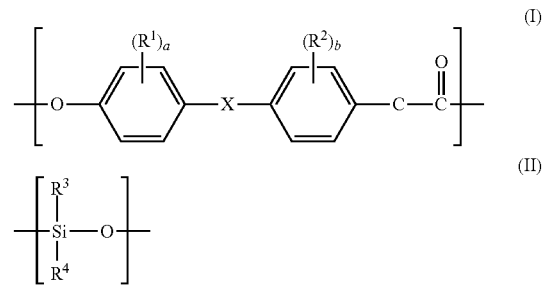

wherein R$^1$ and R$^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, R$^3$ and R$^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and a and b each independently represent an integer of 0 to 4.

2. The polycarbonate-polyorganosiloxane copolymer according to claim 1, wherein the polyorganosiloxane block (B) has an average chain length of 20 to 85.

3. The polycarbonate-polyorganosiloxane copolymer according to claim 1, wherein a content of the polyorganosiloxane block (B) is 0.5 mass % to 20.0 mass % of the polycarbonate-polyorganosiloxane copolymer.

4. The polycarbonate-polyorganosiloxane copolymer according to claim 1, wherein the polycarbonate-polyorganosiloxane copolymer has a viscosity-average molecular weight of 12,000 to 40,000.

5. The polycarbonate-polyorganosiloxane copolymer according to claim 1, wherein in the general formula (I), a and b each represent 0, and X represents a single bond or an alkylene group having 1 to 8 carbon atoms.

6. The polycarbonate-polyorganosiloxane copolymer according to claim 1, wherein in the general formula (I), a and b each represent 0, and X represents an alkylene group having 3 carbon atoms.

7. The polycarbonate-polyorganosiloxane copolymer according to claim 1, wherein in the general formula (II), $R^3$ and $R^4$ each represent a methyl group.

8. A molded article, which is obtained by molding the polycarbonate-polyorganosiloxane copolymer of claim 1.

9. A method of producing the polycarbonate-polyorganosiloxane copolymer of claim 1, comprising using a polyorganosiloxane represented by the following general formula (ii) or (iii) as a raw material:

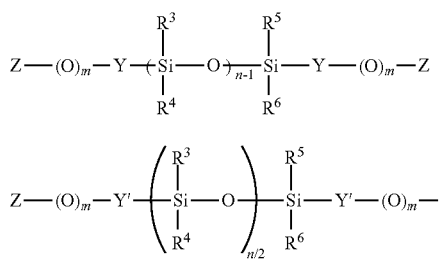
(ii)

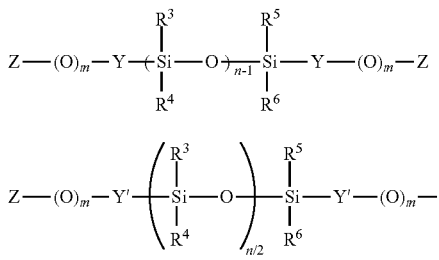
(iii)

wherein $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, Y and Y' each independently represent a single bond, or an organic residue comprising —C(=O)—, an aliphatic moiety, or an aromatic moiety, the organic residue being bonded to Si and O or to Si and Z, n represents an average number of repetitions, m represents 0 or 1, Z each independently represent a halogen, —$R^7$OH, —$R^7$COOH, —$R^7$NH$_2$, —$R^7$NHR$^8$, —COOH, or —SH, $R^7$ represents a linear, branched, or cyclic alkylene group, an aryl-substituted alkylene group, an aryl-substituted alkylene group that may have an alkoxy group on a ring thereof, an arylene group that may be substituted, or an arylene alkyl-substituted aryl group, $R^8$ represents an alkyl group, an alkenyl group, an aryl group, or an aralkyl group, Z' each independently represent —$R^7$O—, —$R^7$COO—, —$R^7$NH—, —COO—, or —S—, $R^7$ represents a linear, branched, or cyclic alkylene group, an aryl-substituted alkylene group, an aryl-substituted alkylene group that may have an alkoxy group on a ring thereof, an arylene group that may be substituted, or an arylene alkyl-substituted aryl group, and β represents a divalent group derived from a diisocyanate compound or a divalent group derived from a dicarboxylic acid, the raw material polyorganosiloxane satisfying the following (1) and (2):

in a differential molecular weight distribution curve obtained from measurement of the polyorganosiloxane by gel permeation chromatography using the polystyrene calibration curve, the curve having an axis of abscissa indicating a logarithmic value log(M) of a molecular weight M and an axis of ordinate indicating dw/d log(M) obtained by differentiating a concentration fraction w with respect to the logarithmic value log(M) of the molecular weight, (1) a dw/d log(M) value becomes maximum in a range of 3.4≤log(M)≤4.0, and (2) in the differential molecular weight distribution curve, a ratio of a value obtained by integrating the dw/d log(M) value over a range of 4.0≤log(M)≤4.5 to a value obtained by integrating the dw/d log(M) value over an entire range of the log(M) is 6% or more and 40% or less.

10. The method of producing the polycarbonate-polyorganosiloxane copolymer according to claim 9, wherein in the general formula (ii) or (iii), an average chain length n is 20 to 85.

11. The method of producing the polycarbonate-polyorganosiloxane copolymer according to claim 9, wherein in the general formula (ii) or (iii), $R^3$ and $R^4$ each represent a methyl group.

12. A polyorganosiloxane, which is represented by the following general formula (ii) or (iii):

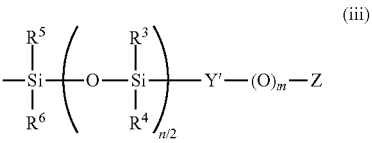
(ii)

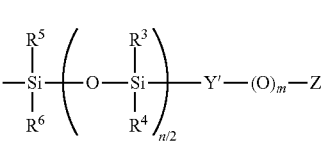
(iii)

wherein $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, Y and Y' each independently represent a single bond, or an organic residue comprising —C(=O)—, an aliphatic moiety, or an aromatic moiety, the organic residue being bonded to Si and O or to Si and Z, n represents an average number of repetitions, m represents 0 or 1, Z each independently represent a halogen, —$R^7$OH, —$R^7$COOH, —$R^7$NH$_2$, —$R^7$NHR$^8$, —COOH, or —SH, $R^7$ represents a linear, branched, or cyclic alkylene group, an aryl-substituted alkylene group, an aryl-substituted alkylene group that may have an alkoxy group on a ring thereof, an arylene group that may be substituted, or an arylene alkyl-substituted aryl group, $R^8$ represents an alkyl group, an alkenyl group, an aryl group, or an aralkyl group, Z' each independently represent —$R^7$O—, —$R^7$COO—, —$R^7$NH—, —COO—, or —S—, $R^7$ represents a linear, branched, or cyclic alkylene group, an aryl-substituted alkylene group, an aryl-substituted alkylene group that may have an alkoxy group on a ring thereof, an arylene group that may be substituted, or an arylene alkyl-substituted aryl group, and β represents a divalent group derived from a diisocyanate compound or a divalent group derived from a dicarboxylic acid, the polyorganosiloxane satisfying the following (1) and (2):

in a differential molecular weight distribution curve obtained from measurement of the polyorganosiloxane by gel permeation chromatography using the polystyrene calibration curve, the curve having an axis of abscissa indicating a logarithmic value log(M) of a molecular weight M and an axis of ordinate indicating dw/d log(M) obtained by differentiating a concentration fraction w with respect to the logarithmic value log(M) of the molecular weight,

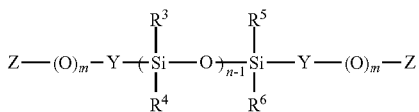

(1) a dw/d log(M) value becomes maximum in a range of 3.4≤log(M)≤4.0, and (2) in the differential molecular weight distribution curve, a ratio of a value obtained by integrating the dw/d log(M) value over a range of 4.0≤log(M)≤4.5 to a value obtained by integrating the dw/d log(M) value over an entire range of the log(M) is 6% or more and 40% or less.

13. The polyorganosiloxane according to claim 12, wherein in the general formula (ii) or (iii), an average chain length n is 20 to 85.

14. A polycarbonate-polyorganosiloxane copolymer comprising a polycarbonate block (A) comprising a repeating unit represented by the following general formula (I); and a polyorganosiloxane block (B) comprising a repeating unit represented by the following general formula (II), wherein the copolymer is obtained by using a polyorganosiloxane represented by the following general formula (ii) or (iii) as a raw material:

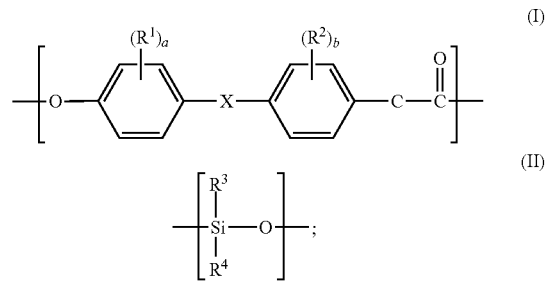

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —$SO_2$—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and a and b each independently represent an integer of 0 to 4,

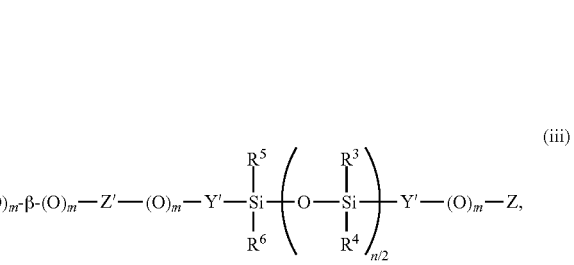

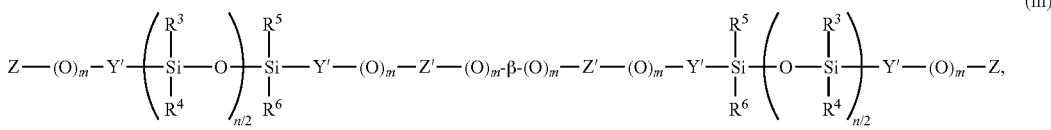

wherein $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, Y and Y' each independently represent a single bond, or an organic residue comprising —C(=O)—, an aliphatic moiety, or an aromatic moiety, the organic residue being bonded to Si and O or to Si and Z, n represents an average number of repetitions, m represents 0 or 1, Z each independently represent a halogen, —$R^7$OH, —$R^7$COOH, —$R^7$NH$_2$, —$R^7$NHR$^8$, —COOH, or —SH, $R^7$ represents a linear, branched, or cyclic alkylene group, an aryl-substituted alkylene group, an aryl-substituted alkylene group that may have an alkoxy group on a ring thereof, an arylene group that may be substituted, or an arylene alkyl-substituted aryl group, $R^8$ represents an alkyl group, an alkenyl group, an aryl group, or an aralkyl group, Z' each independently represent —$R^7$O—, —$R^7$COO—, —$R^7$NH—, —COO—, or —S—, $R^7$ represents a linear, branched, or cyclic alkylene group, an aryl-substituted alkylene group, an aryl-substituted alkylene group that may have an alkoxy group on a ring thereof, an arylene group that may be substituted, or an arylene alkyl-substituted aryl group, and β represents a divalent group derived from a diisocyanate compound or a divalent group derived from a dicarboxylic acid, the raw material polyorganosiloxane satisfying the following (1) and (2):

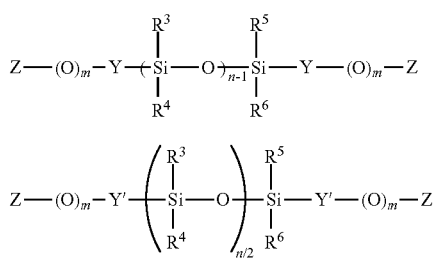

(ii)

(iii)

in a differential molecular weight distribution curve obtained from measurement of the polyorganosiloxane by gel permeation chromatography using the polystyrene calibration curve, the curve having an axis of abscissa indicating a logarithmic value log(M) of a molecular weight M and an axis of ordinate indicating dw/d log(M) obtained by differentiating a concentration fraction w with respect to the logarithmic value log(M) of the molecular weight, (1) a dw/d log(M) value becomes maximum in a range of 3.4≤log(M)≤4.0, and (2) in the differential molecular weight distribution curve, a ratio of a value obtained by integrating the dw/d log (M) value over a range of 4.0≤log(M)≤4.5 to a value obtained by integrating the dw/d log(M) value over an entire range of the log(M) is 6% or more and 40% or less.

15. A method of producing the polycarbonate-polyorganosiloxane copolymer comprising: a polycarbonate block (A) comprising a repeating unit represented by the following general formula (I) and a polyorganosiloxane block (B) comprising a repeating unit represented by the following general formula (II), using a polyorganosiloxane represented by the following general formula (ii) or (iii) as a raw material;

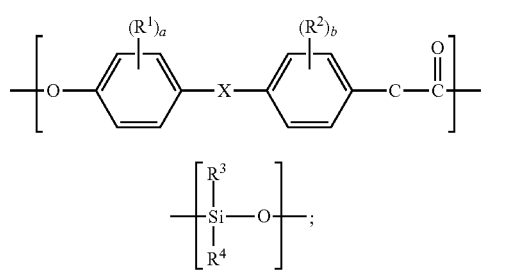

(I)

(II)

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and a and b each independently represent an integer of 0 to 4,

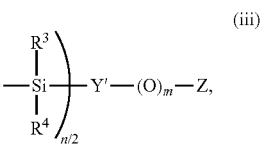

wherein $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, Y and Y' each independently represent a single bond, or an organic residue comprising —C(=O)—, an aliphatic moiety, or an aromatic moiety, the organic residue being bonded to Si and O or to Si and Z, n represents an average number of repetitions, m represents 0 or 1, Z each independently represent a halogen, —R$^7$OH, —R$^7$COOH, —R$^7$NH$_2$, —R$^7$NHR$^8$, —COOH, or —SH, R$^7$ represents a linear, branched, or cyclic alkylene group, an aryl-substituted alkylene group, an aryl-substituted alkylene group that may have an alkoxy group on a ring thereof, an arylene group that may be substituted, or an arylene alkyl-substituted aryl group, R$^8$ represents an alkyl group, an alkenyl group, an aryl group, or an aralkyl group, Z' each independently represent —R$^7$O—, —R$^7$COO—, —R$^7$NH—, —COO—, or —S—, R$^7$ represents a linear, branched, or cyclic alkylene group, an aryl-substituted alkylene group, an aryl-substituted alkylene group that may have an alkoxy group on a ring thereof, an arylene group that may be substituted, or an arylene alkyl-substituted aryl group, and β represents a divalent group derived from a diisocyanate compound or a divalent group derived from a dicarboxylic acid, the polyorganosiloxane satisfying the following (1) and (2):

in a differential molecular weight distribution curve obtained from measurement of the polyorganosiloxane by gel permeation chromatography using the polystyrene calibration curve, the curve having an axis of abscissa indicating a logarithmic value log(M) of a molecular weight M and an axis of ordinate indicating dw/d log(M) obtained by differentiating a concentration fraction w with respect to the logarithmic value log(M) of the molecular weight, (1) a dw/d log(M) value becomes maximum in a range of 3.4≤log(M)≤4.0, and (2) in the differential molecular weight distribution curve, a ratio of a value obtained by integrating the dw/d log (M) value over a range of 4.0≤log(M)≤4.5 to a value obtained by integrating the dw/d log(M) value over an entire range of the log(M) is 6% or more and 40% or less.

* * * * *